(12) United States Patent
Dilley et al.

(10) Patent No.: US 8,906,443 B2
(45) Date of Patent: Dec. 9, 2014

(54) FROZEN AERATED CONFECTIONS

(75) Inventors: Kevin Michael Dilley, Sharnbrook (GB); Julia Helen Greenacre, Rushden (GB); Kevin Warren Smith, Sharnbrook (GB); Jeffrey Underdown, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 1770 days.

(21) Appl. No.: 11/793,943

(22) PCT Filed: Dec. 19, 2005

(86) PCT No.: PCT/EP2005/014241
§ 371 (c)(1),
(2), (4) Date: Jun. 21, 2007

(87) PCT Pub. No.: WO2006/066979
PCT Pub. Date: Jun. 29, 2006

(65) Prior Publication Data
US 2008/0206425 A1    Aug. 28, 2008

(30) Foreign Application Priority Data
Dec. 19, 2005  (EP) ................................. 04258092

(51) Int. Cl.
A23G 9/00       (2006.01)
A23G 9/32       (2006.01)

(52) U.S. Cl.
USPC .......................................... 426/660; 426/565

(58) Field of Classification Search
USPC .................. 426/565, 601, 607, 660
See application file for complete search history.

(56) References Cited

U.S. PATENT DOCUMENTS

| | | |
|---|---|---|
| 2,176,023 A | 10/1939 | Musher |
| 3,003,882 A | 10/1961 | Peat |
| 3,949,102 A | 4/1976 | Hellyer et al. |
| 4,400,405 A | 8/1983 | Morley |
| 4,552,773 A | 11/1985 | Kahn et al. |
| 4,631,196 A | 12/1986 | Zeller |
| 4,908,223 A | 3/1990 | Murtaugh et al. |
| 4,954,360 A | 9/1990 | Barnett |
| 5,215,776 A | 6/1993 | Peterson |
| 5,393,551 A | 2/1995 | Arcadipane |
| 5,478,587 A | 12/1995 | Mingione |
| 5,659,028 A | 8/1997 | Coussement |
| 5,958,476 A | 9/1999 | Cain et al. |
| 5,962,062 A | 10/1999 | Carrie et al. |
| 5,968,582 A | 10/1999 | Vaghela |
| 6,090,429 A | 7/2000 | Wilson |
| 6,120,813 A | 9/2000 | Barnes |
| 6,399,138 B1 | 6/2002 | Cain et al. |
| 6,410,078 B1 | 6/2002 | Cain et al. |
| 6,491,960 B1 | 12/2002 | Daniel |
| 6,558,729 B1 | 5/2003 | Riviere |
| 6,613,374 B1 | 9/2003 | Fayard et al. |
| 6,685,977 B1 * | 2/2004 | Asano et al. ................. 426/565 |
| 7,008,660 B2 | 3/2006 | Allouche |
| 2002/0034562 A1 | 3/2002 | Sundram et al. |
| 2002/0182300 A1* | 12/2002 | Groh et al. .................... 426/566 |
| 2003/0134024 A1 | 7/2003 | Malone |
| 2004/0091597 A1 | 5/2004 | Ghaffari |
| 2005/0042333 A1 | 2/2005 | Bartkowska et al. |
| 2006/0141102 A1 | 6/2006 | Fleming |
| 2006/0141103 A1 | 6/2006 | Heritage et al. |
| 2008/0044521 A1 | 2/2008 | Eddies |
| 2008/0175972 A1 | 7/2008 | Cox et al. |

FOREIGN PATENT DOCUMENTS

| | | |
|---|---|---|
| CA | 2204467 | 5/1997 |
| EP | 0509509 A1 | 10/1992 |
| EP | 0739589 | 10/1996 |
| EP | 0740905 | 11/1996 |
| EP | 0560944 | 6/1999 |
| EP | 0933029 | 8/1999 |
| EP | 1097708 | 9/2003 |
| EP | 0815735 | 3/2004 |
| EP | 1396193 A2 | 3/2004 |
| EP | 1088552 | 4/2006 |
| EP | 1673980 | 6/2006 |
| GB | 506031 | 5/1939 |
| GB | 529745 | 11/1940 |
| GB | 961398 | 6/1964 |
| GB | 1256290 | 12/1971 |

(Continued)

OTHER PUBLICATIONS

Goh, Applications and Uses of Palm and Palm Kernel Oils in Speciality Products, Presented Apr. 8-9, 2002, pp. 1-5.*
Scientific Psychic, "Fats, Oils, Fatty Acids, Triglycerides", pp. 1-4. http://www.scientificpsychic.com/fitness/fattyacidsl.html Copyright 2005.*
International Search Report International Application No. PCT/EP2005/014241 mailed Jun. 6, 2006. pp. 1-3.
European Search Report Application No. EP 04258092 dated Jun. 1, 2005. pp. 1-3
References Patent Abstracts of Japan, vol. 006, No. 106 (C-108), 6/82, & JP 57036944 (Lotte Co. Ltd.), 2/82. p. 1.
Patent Abstracts of Japan, vol. 005, No. 028 (C-044), 2/81, & JP 55153561 (Fuji Oil Co. Ltd.), 11/80. p. 1.

(Continued)

Primary Examiner — Kelly Bekker
(74) Attorney, Agent, or Firm — Gerard J. McGowan, Jr.

(57) ABSTRACT

A frozen aerated confection having an overrun of at least 40% and a fat component in an amount of 2 to 20% (by weight of the frozen aerated confection), said fat component comprising triglycerides of fatty acids wherein no more than 55% (by weight of the fatty acids) of the fatty acids in the triglycerides are saturated, less than 8% (by weight of the triglycerides) of the triglycerides are long chain SSS triglycerides; characterized in that the ratio of the percentage of fat that is solid at 5° C. to the percentage of the fatty acids in the triglycerides that are saturated (by weight of the fatty acids) is greater than 1 and in that the fat component comprises at most 60% (by weight) cocoa butter or shea nut oil.

10 Claims, No Drawings

(56) References Cited

FOREIGN PATENT DOCUMENTS

| | | |
|---|---|---|
| GB | 144820 | 4/1976 |
| GB | 2191676 | 12/1987 |
| JP | 57036943 | 2/1982 |
| JP | 4316453 | 10/1992 |
| JP | 06237697 | 8/1994 |
| LV | 12599 | 1/2001 |
| NL | 8702797 A | 6/1989 |
| WO | WO9210105 | 6/1992 |
| WO | WO9321777 | 11/1993 |
| WO | WO9321778 A1 | 11/1993 |
| WO | WO 96/39857 | 12/1996 |
| WO | WO 00/30463 | 6/2000 |
| WO | WO0130175 A1 | 5/2001 |
| WO | WO 02/11550 | 2/2002 |
| WO | WO0241702 A2 | 5/2002 |
| WO | WO02089596 A1 | 11/2002 |
| WO | WO 03/007705 | 1/2003 |
| WO | WO 2005/016023 | 2/2005 |
| WO | WO2005070183 | 8/2005 |
| WO | WO2006099987 | 9/2006 |

OTHER PUBLICATIONS

Patent Abstracts of Japan, vol. 2003, No. 12, 12/03, & JP 2003 250455 (Meiji Milk Prod. Co. Ltd.), 9/03. p. 1.

American Journal of Clinical Nutrition, Chapter 1 Introduction, 1988, 48 pages 1083, 1101, and 1102.

Calculating Molecular Weights, Polymer Science Learning Center, 2005, 1-4.

Food composition and nutrition tables, Medpharm, 2000, 1084XP002467723, "Ice Cream Sundae" p. 1.

Food composition and nutrition tables, Medpharm, 2000, 53XP002467724, "Dried Whey" p. 1.

Heavy Cream, Heavy Cream, Feb. 1, 2001, Webtender.com, US p. 1.

Nutrition Facts, Milk, fluid, nonfat, calcium fortified (fat free or skim), Dec. 21, 2006, Nutritiondata.self.com, US p. 1.

Opinion on Maltitol Syrup Not Covered by the Current Specifications, Scientific Committee on Food Jun. 1999, pp. 1-5.

Overrun Calculations, Dairy Science and Technology, Dec. 20, 2007, Foodscience.uoguelph.ca, US p. 1.

Rice dream Vanilla Frozen Dessert, Rice Dream Vanilla Frozen Dessert, Nov. 11, 2009, 1-3, US.

What does the term "milk-solids-nonfat" mean?, Innovate with Dairy 2009 1 P, Jun. 19, 2009, 1.

Akin et al., Effects of inulin and sugar levels on the viability of yogurt and probiotic bacteria and the physical and sensory characteristics in probiotic ice-cream, Food Chemistry, 2007, 93-99, 104, Elsevier.

Marshall et al., Corn Sweeteners, Ice Cream 6th Ed 2003 pp. 75-76, 2003, 75-76, 6th Ed.

Marshall et al., Ice Cream Ind, Aspen Publishers 1988 5th Ed. p. 2, Jan. 1, 1988, 2, 5th Ed, Aspen Publishers, US.

Marshall, Ice Cream, Ice Cream, 2010, 56-57 66-67, 6th Ed, Kluwer Academic/Planum Publishers.

Richard D. O'Brien, Hydrogenated Basestock System, Fats and Oils, 1998, pp. 273-276, US.

Robert T. Marshall, Ice Cream—Fifth Edition, Ice Cream—Fifth Edition, pp. 140-141, An Aspen Publications.

Scogs Report, FDA U.S. Food and Drug Administration, Grass Substances (SCOGS) Database, Aug. 31, 2011, fda.gov "Corn Syrup" p. 1.

Smith et al., Effects on Freezing Point of Carbohydrates Commonly Used in Frozen Desserts, J Dairy Sci 1983 66 pp. 2464-2467.

* cited by examiner

FROZEN AERATED CONFECTIONS

TECHNICAL FIELD OF THE INVENTION

The invention relates to a fat-containing frozen aerated confection such as ice cream, wherein the fat content of the frozen aerated confection comprises fats which contain relatively low amounts of saturated fatty acids.

BACKGROUND TO THE INVENTION

Fat is an important constituent of frozen aerated confections such as ice cream. Fats are largely made up of triglycerides (approximately 98%), together with minor amounts of other components such as phospholipids and diglycerides. Triglycerides are esters of glycerol with three fatty acids, which may be the same or different. Fatty acids which have no carbon-carbon double bonds are said to be saturated (herein abbreviated as SAFA), whereas fatty acids that contain one or more carbon-carbon double bonds are said to be unsaturated.

The conventional manufacturing process for frozen aerated confections consists of a number of steps: (i) mixing the ingredients, (ii) pasteurisation and homogenisation, (iii) ageing, (iv) aerating and partially freezing the mix, (v) extrusion from the freezer, and (vi) hardening. This process is described in detail in, for example, Arbuckle, W. S., Ice Cream, $4^{th}$ Edition, AVI publishing 1986, chapters 11-13. In the ageing step, the mix is held at a low temperature, typically 4° C., for a period of time, typically a few hours. One purpose of the ageing step is to allow time for the fat (which is liquid at the pasteurization temperature) to crystallize before the mix is frozen and aerated. Traditionally, frozen aerated confections such as ice cream have been prepared with fats having a high proportion of saturated fat, for example dairy fat (60-70%) or coconut oil (>90%). Saturated fats are used because they crystallise relatively easily during the ageing step so that most of the fat is solid during freezing and aeration. This is important because the presence of solid fat results in ice cream that can be aerated uniformly and consistently, retains its shape after extrusion and has a good texture when eaten. Shape retention is a critical factor in producing some product formats, for example Viennetta™. Such products cannot normally be produced with a low level of solid fat.

Consumers are now looking for frozen aerated confections which have all the properties of these traditional products but which are healthier. One concern that consumers have is that eating saturated fats increases the low density lipoproteins (LDL) in their circulation. Increased LDL levels are believed to be associated with increased risk of coronary heart disease and stroke. Replacing the saturated fats in the diet with unsaturated fats has been proposed as one way to reduce the amount of potentially harmful LDLs in the blood.

Ice creams made with fats having SAFA levels lower than those of dairy fat are known. JP 55/153561 describes the use of the medium-melting fraction of palm oil to produce ice cream which has similar palatability and melting properties in the mouth to ice cream based on milk fat. However, the SAFA contents relatively high and the problem of reducing the SAFA content is not addressed.

Attempts have also been made to produce frozen aerated confections using fats with low saturated fatty acid contents. However, it is difficult to design low SAFA fats for frozen aerated confections because a number of different interacting criteria must be satisfied simultaneously. Simply replacing saturated fats with unsaturated fats provides the health benefit, but at the expense of the processability and texture of the confection because unsaturated fats do not contain sufficient solid fat. JP 57/036944 describes the production of ice cream with oils that are very low in SAFA, such as safflower oil and sunflower oil. To overcome the problem of producing good ice cream with liquid fat, it was found necessary to use a special emulsifier in the form of a sucrose fatty acid ester. However, such additives can detract from the attractiveness of the product to consumers.

There is a need therefore to provide low SAFA fats for use in frozen aerated confections which give good processing properties (such as aeration and shape retention on extrusion) and good texture for the consumer, but do not require other additives, such as sucrose fatty acid esters.

TESTS AND DEFINITIONS

All percentages given herein, with the exception of overrun, are on a weight/weight basis, unless otherwise stated.

Frozen Aerated Confection

The term "frozen aerated confection" as used in this specification means a frozen confection made by freezing a pasteurised mix of ingredients with agitation to incorporate air, for example ice cream. This term is not intended to encompass other components such as chocolate with which may be used in combination with a frozen aerated confection (for example as a coating or an inclusion) to make a final product. Frozen aerated confections contain water, a fat component, one or more sweeteners, proteins (normally milk proteins), and optionally other ingredients such as emulsifiers, stabilisers, colours and flavours.

Fatty Acids

The term "fatty acids" as used herein includes fatty acid residues in a triglyceride molecule.

Classification of Triglycerides

Triglycerides are classified according to the number of saturated (denoted S) and unsaturated (denoted U) fatty acids they contain, i.e. SSS (triglycerides with three saturated fatty acids), SSU (two saturated and one unsaturated); SUU (one saturated and two unsaturated); and UUU (three unsaturated). This notation does not distinguish between the alternative possible positions for the fatty acids in the triglyceride. Natural sources of fats, for example coconut oil, palm oil, sunflower oil and dairy fat are mixtures of triglycerides. The relative amounts of SSS, SSU, SUU and UUU triglycerides depend on the source of the fat.

The triglyceride composition (in terms of SSS, SSU, SUU and UUU) is determined using an Agilent 6890+ gas chromatography system with automated on column injection onto a capillary column with flame ionization detection and oven track injection mode. A Quadrex 15 m, 0.25 mm internal diameter, 0.1 µm film 65% phenyl-methyl silicone gas chromatography column is used. Fats are dissolved in iso-octane at a concentration of around 0.3 mg/mL (0.25-0.50 mg/mL) and a volume of 0.1 µL is injected using the Agilent nano adaptor set to ON with 1 µL volume setting. The carrier gas is helium, at a constant flow of 1 ml/minute (initial linear velocity ~30 cm/s). The oven program is as follows: hold at 80° C. for 0.5 minutes, ramp to 330° C. at 50° C./minute, triglyceride separation from 330° C. to 350° C. ramping at 1° C./minute.

Calibration is by reference to standard triglyceride carbon number data, which is acquired using a Quadrex 10 m 0.53 mm internal diameter 0.1 µm film methyl-5% phenyl capillary gas chromatography column. The column is fitted into a Perkin Elmer AutoXL system with a programmable temperature vaporising injector configured in direct on-column mode. The oven program is: ramp from 200° C. to 325° C. at 10° C./minute, and then from 325° C. to 355° C. at 5° C./minute. The carrier gas is helium at typically 40 kPa.

Long Chain SSS Triglycerides

Long chain SSS triglycerides are SSS triglycerides for which the sum of the acyl chain lengths of the three fatty acids is greater than 46 carbon atoms. Long chain SSS triglycerides melt at relatively high temperatures, above the temperature of the mouth.

SAFA

The amount of SAFA in a fat or a blend of fats is the percentage (by weight) of saturated fatty acids, i.e. fatty acids which have no carbon-carbon double bonds. The SAFA content of fats can be found in standard reference works such as "The Lipid Handbook", Second Edition, Authors Frank D Gunstone, John L Harwood, Fred B Padley, Published by Chapman & Hall 1994 from which the data in this specification are taken.

Solid Fat

The amount of solid fat means the percentage of the fat in solid form at 5° C. as measured by pulse NMR spectroscopy as follows. The fat or fat blend is first heated to 80° C. and then held at 60° C. for 30 minutes, so that the fat is completely melted. It is then cooled to and held at 0° C. for one hour. It is then warmed to 5° C. (the measurement temperature) and held for 30 minutes. The amount of solid fat is then measured with a standard pulse NMR technique using a NMS 120 Minispec NMR spectrometer.

Vegetable Fat

The term "vegetable fat" used herein means fat obtained from a plant source, including fats that have been fractionated and blends of fats from plant sources. Vegetable fats that are liquid at ambient temperatures are often referred to as vegetable oils. In this specification the term "vegetable fat" includes such vegetable oils.

Overrun

Overrun is calculated according to the formula

% Overrun=$100 \times [Wt_{mix} - Wt_{fac}]/Wt_{fac}$ in which $Wt_{mix}$ is the weight of a certain volume of the mix from which the frozen aerated confection is to be prepared and $Wt_{fac}$ is the weight of the same volume after it has been frozen and aerated.

Sweetener

Sweetener means a mono-, di- or oligo-saccharide, or a corn syrup, or a sugar alcohol, or a mixture thereof. Sweeteners include sucrose, fructose, lactose, dextrose, invert sugar, corn syrup and sorbitol.

Stabilisers

Stabilisers are defined as in Arbuckle, W. S., Ice Cream, 4$^{th}$ Edition, AVI publishing 1986, chapter 6, pages 84-92. Stabilisers include alginates, gum arabic, gum ghatti, gum karaya, gum tragacanth, locust bean gum, carrageenan, xanthan gum, guar gum, gelatine, agar, sodium carboxymethylcellulose, microcrystalline cellulose, methyl and methylethyl celluloses, hydroxypropyl and hydroxypropylmethyl celluloses, low and high methoxyl pectins and mixtures thereof.

Emulsifiers

Emulsifiers are defined as in Arbuckle, W. S., Ice Cream, 4$^{th}$ Edition, AVI publishing 1986, chapter 6, pages 92-94. Emulsifiers include mono- and di-glycerides of saturated or unsaturated fatty acids (e.g. monoglyceryl palmitate—MGP), polyoxyethylene derivatives of hexahydric alcohols (usually sorbitol), glycols, glycol esters, polyglycerol esters, sorbitan esters, stearoyl lactylate, lactic acid esters, citric acid esters, acetylated monoglyceride, diacetyl tartaric acid esters, polyoxyethylene sorbitan esters, lecithin and egg yolk and mixtures thereof.

BRIEF DESCRIPTION OF THE INVENTION

It has now been found that by carefully selecting the fat according to specific criteria, it is possible to make frozen aerated confections with low SAFA contents whilst maintaining good processing properties and texture. Accordingly, the present invention provides a frozen aerated confection having an overrun of at least 40% and a fat component in an amount of 2 to 20% (by weight of the frozen aerated confection), said fat component comprising triglycerides of fatty acids wherein:

no more than 55% (by weight of the fatty acids) of the fatty acids in the triglycerides are saturated;

less than 8% (by weight of the triglycerides) of the triglycerides are long chain SSS triglycerides;

characterized in that the ratio of the percentage of fat that is solid at 5° C. to the percentage of the fatty acids in the triglycerides that are saturated (by weight of the fatty acids) is greater than 1 and in that the fat component comprises at most 60% (by weight) cocoa butter or shea nut oil.

We have found that by ensuring that the ratio of solid fat:SAFA is greater than 1 and by avoiding long chain SSS triglycerides, it is possible to make frozen aerated confections with low SAFA contents whilst maintaining good processing properties and avoiding the unpleasant waxy texture arising from the high-melting long chain SSS triglycerides.

Preferably the sum of the percentages of SSU and SUU triglycerides (by weight of the triglycerides) is greater than 50%, more preferably greater than 60%. Preferably the ratio of the percentage of SSU triglycerides (by weight of the triglycerides) to the percentage of the SUU triglycerides (by weight of the triglycerides) is greater than 1. It is known that adding SSS triglycerides to aid crystallisation can increase the solids content of fats. For example EP 740905 discloses adding fats rich in SSS triglycerides (such as hydrogenated coconut oil, hydrogenated palm kernel oil or hydrogenated rapeseed oil) to a fat rich in SSU triglycerides (such as palm mid fraction or cocoa butter) to improve the processing properties and mouthfeel of ice cream. However, it has now been found that SSU triglycerides are as effective as SSS triglycerides at increasing the solid fat content of fats rich in SUU triglycerides, and advantageously also have lower SAFA content. Accordingly, by carefully selecting the appropriate combination of SSS, SSU, SUU and UUU triglycerides it is possible to provide a low SAFA fat with a high solid fat content. As a result it is possible to make frozen aerated confections with low SAFA contents whilst maintaining good processing properties and texture and without requiring other additives. It will be appreciated by those skilled in the art that the desired combination of SSS, SSU, SUU and UUU triglycerides may be achieved by mixing two or more fats.

Preferably the ratio of the percentage of SSU triglycerides (by weight of the triglycerides) to the percentage of the SUU triglycerides (by weight of the triglycerides) is less than 10, preferably less than 7, most preferably less than 3. The lower this ratio, the lower the amount of saturated fat, and therefore the greater the health benefit.

Preferably the fat component comprises at least 90%, preferably at least 95% vegetable fat. Dairy fat is relatively high in saturated fats.

Preferably the total amount of saturated fatty acids (by weight of the fatty acids) is less than 50%, more preferably less than 45%, most preferably less than 40%. The lower the amount of saturated fat, the greater the health benefit.

Preferably the total amount of saturated fatty acids (by weight of the fatty acids) is greater than 30%. It has been found that fats having at least this amount of saturated fatty acids result in very good processing properties and texture.

Preferably less than 7%, more preferably less than 6%, most preferably less than 5% (by weight of the triglycerides)

of the triglycerides are long chain SSS triglycerides. The lower the amount of long chain SSS triglycerides, the less waxy is the texture.

Preferably less than 8% (by weight of the triglycerides) of the triglycerides are SSS triglycerides.

Preferably at least 60% (by weight of the saturated fatty acids) are palmitic acid. Fats from sources such as palm oil in which a high proportion of the saturated fatty acids are palmitic acid are suitable bases for providing fractions and blends according to the invention.

Preferably the frozen aerated confection comprises at least 5%, more preferably at least 8% fat component (by weight of the frozen aerated confection). Preferably the frozen aerated confection comprises at most 12%, more preferably at most 10% fat component (by weight of the frozen aerated confection). Frozen aerated confections with fat contents in these ranges are particularly acceptable to consumers.

Preferably the frozen aerated confection has an overrun of at least 50%, more preferably at least 80%. Preferably the frozen aerated confection has an overrun of at most 250%, more preferably at most 150%, most preferably at most 110%. Frozen aerated confections with overruns in these ranges are particularly acceptable to consumers.

Preferably the frozen aerated confection additionally comprises at least 0.25% milk solids not fat (MSNF) (by weight of the frozen aerated confection). MSNF contains milk proteins and lactose. Preferably the frozen aerated confection comprises at most 20% MSNF. MSNF may be provided by using dried skimmed milk and/or dried whey.

Preferably the frozen aerated confection additionally comprises at least 0.01% emulsifier, more preferably at least 0.1% (by weight of the frozen aerated confection). Preferably the frozen aerated confection additionally comprises at most 1% emulsifier, more preferably at most 0.5% (by weight of the frozen aerated confection). Preferably the emulsifier is not a sucrose fatty acid ester.

Preferably the frozen aerated confection additionally comprises at least 0.01% stabiliser, more preferably at least 0.05%, most preferably at least 0.1% (by weight of the frozen aerated confection). Preferably the frozen aerated confection additionally comprises at most 1% stabiliser, more preferably at most 0.8%, most preferably at most 0.5% (by weight of the frozen aerated confection). Stabilisers can improve the mouthfeel of frozen aerated confections.

DETAILED DESCRIPTION OF THE INVENTION

The present invention will be further described in the following examples and comparative examples in which compositions demonstrating various facets of the invention were prepared. The examples are by way of illustration only, and are not to limit the invention.

Examples

Table 1 lists the sources of the fats used in the examples and comparative Examples.

TABLE 1

| Fat | Abbreviation | Supplier | Supplier's Code |
|---|---|---|---|
| Palm Oil | PO | Cargill | RPO |
| Olein fraction of palm oil (single fractionation) | POF | Cargill | ROL |
| Mid fraction of palm oil (single fractionation) | PMF | Loders Croklaan | Creamelt 900 |
| Stearin fraction of palm oil (single fractionation) | PSF | Loders Croklaan | Revel A |
| Olein fraction of palm oil (double fractionation) | POF2 | Loders Croklaan | LC 200 |

TABLE 1-continued

| Fat | Abbreviation | Supplier | Supplier's Code |
|---|---|---|---|
| Mixture of palm fractions | PF | Loders Croklaan | Creamelt 700 |
| Sunflower oil | SF | Cargill | RYOW |
| Rapeseed oil | RP | Cargill | RRO |
| Coconut oil | CN | Van den Bergh Oils | |

Fat Crystallisation

The effect of adding 20% of a fat rich in SSS triglycerides (the stearin fraction of palm oil) or 20% of a fat rich in SSU (the mid fraction of palm oil) on the solids content at 5° C. of a fat rich in SUU (the double fractionated olein fraction of palm oil) was determined using the method described above. The SAFA contents, the measured solids contents and the solid:SAFA ratios are given in Table 2.

TABLE 2

| Fat | SAFA (%) | Solid fat at 5° C. (%) | Solid fat/SAFA |
|---|---|---|---|
| 100% POF2 | 40 | 2.5 | 0.063 |
| 80% POF2 20% PSF | 49 | 50 | 1.0 |
| 80% POF2 20% PMF | 45 | 50 | 1.1 |

Adding a fat rich in SSU produced the same increase in solid fat at 5° C. as adding a fat rich in SSS, but with a smaller increase in the amount of SAFA i.e. to 45% rather than to 49%. This data shows that SSU triglycerides are more effective than SSS at increasing the solids: SAFA ratio of a SUU rich fat.

Ice Creams

Ice creams were prepared using fats and fat blends according to the present invention (Examples 1-11). These are based on one or more palm oil components, some of which are diluted with rapeseed oil or sunflower oil. Ice creams were also prepared using fats and fat blends which are outside the scope of the invention (Comparative Examples A-F). The fats and fat blends are listed in Table 3.

TABLE 3

| Example | Fat blend |
|---|---|
| 1 | 65 PO 35 RP |
| 2 | 57 PMF 43 RP |
| 3 | 65 PMF 35 SF |
| 4 | 83 POF 17 RP |
| 5 | 80 POF2 20 PMF |
| 6 | 40 POF2 40 PMF 20 SF |
| 7 | 23 POF 44 PF 33 SF |
| 8 | 27 POF 50 PF 23 SF |
| 9 | 15 POF2 35 PMF 50 SF |
| 10 | 80 PMF 20 SF |
| Comparative A | 100 CN |
| Comparative B | 100 PO |
| Comparative C | 65 PO 35 PSF |
| Comparative D | 29 CN 71 SF |
| Comparative E | 100 POF 2 |
| Comparative F | 60 PO 40 SF |

The triglyceride composition, SAFA content, and solid fat content of the Examples and Comparative Examples are given in Table 4. The exact composition of fats varies between sources and the numbers given are typically averages. Because of experimental and rounding errors, the sum SSS+SSU+SUU+UUU may not be exactly 100% in every case.

TABLE 4

| | SSS | SSU | SUU | UUU | SSU/SUU | SSU + SUU | SAFA | Solid fat | Solid fat/SAFA |
|---|---|---|---|---|---|---|---|---|---|
| Examples | | | | | | | | | |
| 1 | 5.9 | 31.8 | 28.8 | 32.3 | 1.10 | 60.6 | 36 | 40 | 1.1 |
| 2 | 3.5 | 51.4 | 8.6 | 35.4 | 6.01 | 59.9 | 40 | 57 | 1.4 |
| 3 | 4.2 | 60.4 | 11.2 | 23.7 | 5.37 | 71.6 | 47 | 66 | 1.4 |
| 4 | 1.2 | 42.4 | 36.4 | 19.0 | 1.16 | 78.7 | 40 | 49 | 1.2 |
| 5 | 1.7 | 46.4 | 44.5 | 6.0 | 1.04 | 90.9 | 44 | 50 | 1.1 |
| 6 | 2.9 | 52.1 | 27.7 | 16.4 | 1.88 | 79.8 | 45 | 54 | 1.2 |
| 7 | 1.6 | 49.0 | 24.3 | 24.5 | 2.02 | 73.3 | 41 | 47 | 1.2 |
| 8 | 1.8 | 55.2 | 24.3 | 18.1 | 2.27 | 79.5 | 45 | 55 | 1.2 |
| 9 | 2.5 | 40.3 | 21.8 | 34.8 | 1.85 | 62.0 | 35 | 40 | 1.2 |
| 10 | 5.0 | 72.7 | 8.1 | 13.6 | 9.04 | 80.8 | 55 | 79 | 1.4 |
| Comparative Examples | | | | | | | | | |
| A | 76.2 | 22.1 | 0.3 | 0.0 | 65.1 | 22.5 | 92 | 87 | 0.95 |
| B | 9.1 | 48.2 | 36.3 | 5.5 | 1.33 | 84.5 | 51 | 55 | 1.1 |
| C | 31.7 | 37.3 | 26.0 | 4.0 | 1.43 | 63.3 | 64 | 69 | 1.1 |
| D | 22.4 | 11.2 | 17.9 | 47.9 | 0.63 | 29.1 | 36 | 18 | 0.49 |
| E | 0.8 | 37.7 | 52.8 | 7.2 | 0.71 | 90.5 | 40 | 2.5 | 0.06 |
| F | 5.6 | 31.6 | 31.8 | 30.3 | 0.99 | 63.4 | 36 | 34 | 0.94 |

Examples 1-10 according to the invention all have SAFA contents of no more than 55%, SSS<8% (hence long chain SSS<8%), and solid fat:SAFA>1. Comparative Examples A-F do not satisfy all of these criteria and are therefore outside the scope of the invention.

Ice creams were prepared to the formulation given in Table 5 using the examples as the fat source, according to the following process. Water was placed in a jacketed mix tank at 85° C., then all the ingredients except for the colour and flavour were dissolved by mixing with a high shear mixer. Hot water was circulated in the jacket of the tank to maintain a premix temperature of 65° C. The premix was heated using a plate heat exchanger to a temperature of 83° C., homogenised using a the first stage of a Crepaco double stage valve homogeniser at a pressure of 140 bar. After holding the mix at 82 to 85° C. for 12 seconds, the mix was cooled using a tubular heat exchanger to 4-6° C. and held at this temperature for at least 2 hours before freezing. The colour and flavour were added to the cooled mix. The mix was processed through a continuous ice cream freezer (type APV Technohoy MF75) fitted with an open dasher rotating at a speed of 370 to 400 rpm and operating with a barrel pressure in the range 1-4 bar. The ice creams were produced with a mix flow rate of between 0.6 and 0.63 liters/minute, with an overrun of 100% and an extrusion temperature in the range −7.5 to −7.8° C. They were collected in 500 ml waxed paper cartons and then hardened in a blast freezer at −35° C. for a period of 2 hours. The hardened ice creams were stored at −25° C.

TABLE 5

| Ingredient | Amount (% by weight) |
|---|---|
| Water | 59.76 |
| Skimmed milk powder | 4.12 |
| Concentrated whey Avonol 600 | 3.24 |
| Glucose syrup LF9 (63DE) | 11.66 |
| Emulsifier GMS | 0.285 |
| Guargum | 0.0625 |
| Carrageenan L100 | 0.0175 |
| Locust bean gum | 0.145 |
| Sucrose | 11.5 |
| Vanillin | 0.011 |
| Vanilla pods | 0.033 |
| Vanillin flavour | 0.16 |

TABLE 5-continued

| Ingredient | Amount (% by weight) |
|---|---|
| Colour (beta carotene 10%) | 0.0042 |
| Fat component | 9.00 |

Results

Examples 1-10 according to the invention all produced ice creams which processed well (i.e. they could reliably be aerated to 100% overrun and were smooth and dry on extrusion) and had good shape retention. On eating, the ice creams had a good texture and did not have a waxy mouthfeel.

Comparative example A (coconut oil) is a conventional fat source for ice cream. The ice cream processed well and had good shape retention on extrusion. However the fat has a very high SAFA content (92%). Although the amount of SSS triglycerides is high (76%), the SSS triglycerides in coconut oil almost entirely have short acyl chains, so that the amount of long chain SSS triglycerides is less than 8%. As a result, comparative example A did not have a waxy texture. Comparative examples B (palm oil) and C (a blend of palm oil and the stearin fraction of palm oil) have somewhat lower SAFA contents, solid fat:SAFA>1, SSU:SUU>1 and SSU+SUU>50%. However, unlike coconut oil, the SSS triglycerides in palm oil and palm oil fractions are almost entirely long chain SSS triglycerides (approximately 99% for PO and PSF). As a result, the long chain SSS triglyceride contents of comparative examples B and C are greater than 8%, and although the ice cream made with these fats processed well, it had an unpleasant waxy texture.

Comparative examples D, E and F have low SAFA contents (36 to 40%), but have solid fat:SAFA<1. Comparative example D (a blend of coconut oil and sunflower oil) is largely comprised of SSS and UUU triglycerides. It has SSU+SUU<50% and also SSU:SUU<1. Its solid fat content was measured to be 18%. On processing, aeration was observed to be inconsistent, and the ice cream had a thin, icy, cold eating texture. The poor quality of the ice cream arises from the low solid fat content. Although this blend has a SSS triglyceride content of about 22%, these are almost entirely short chain triglycerides which do not cause a waxy mouthfeel.

Comparative example E (the double fractionated olein fraction of palm oil) has SSU+SUU of 90% and SSS<8%.

However the SSU:SUU ratio is less than one and the solid fat content was only 2.5%. Ice cream made with this fat processed very poorly. It was not possible to achieve 100% overrun. On extrusion, the ice cream was wet and non-uniform, and had poor shape retention. Popping of air bubbles was observed, i.e. air was visibly lost from the structure. On eating, the ice cream had a thin, coarse, icy texture and was very cold-eating. Again, the poor quality of the ice cream is due to the very low solid fat content.

Comparative example F (a blend of palm oil and sunflower oil) had solids:SAFA and SSU:SUU ratios of 0.94 and 0.99 respectively. Ice cream made with this fat also processed poorly and suffered from the same defects as comparative example D.

The comparative examples show that simply replacing some of a fat high in SAFA with one low in SAFA is not sufficient to produce good quality ice cream with a SAFA content of no more than 55%. However, the examples according to the invention show that by carefully choosing the fat source according to certain specific criteria (the solid fat content and triglyceride composition), good quality ice cream can be produced with SAFA contents of less than 55%, and even as low as 35%.

The invention claimed is:

1. A frozen aerated confection having an overrun of at least 40% and a fat component in an amount of 2 to 20% (by weight of the frozen aerated confection), said fat component comprising triglycerides of fatty acids wherein:
no more than 55% (by weight of the fatty acids) of the fatty acids in the triglycerides are saturated;
less than 6% (by weight of the triglycerides) of the triglycerides are long chain SSS triglycerides;
wherein the ratio of the percentage of fat that is solid at 5° C. to the percentage of the fatty acids in the triglycerides that are saturated (by weight of the fatty acids) is 1.2 or greater and in that the fat component comprises at most 60% (by weight) cocoa butter or shea nut oil.

2. A frozen aerated confection according to claim 1 wherein the sum of the percentages of SSU and SUU triglycerides (by weight of the triglycerides) is greater than 50%.

3. A frozen aerated confection according to claim 1 wherein the ratio of the percentage of SSU triglycerides (by weight of the triglycerides) to the percentage of the SUU triglycerides (by weight of the triglycerides) is greater than 1.

4. A frozen aerated confection according to claim 1 wherein the ratio of the percentage of SSU triglycerides (by weight of the triglycerides) to the percentage of the SUU triglycerides (by weight of the triglycerides) is less than 10.

5. A frozen aerated confection according to claim 1 wherein the fat component comprises at least 90% (by weight) vegetable fat.

6. A frozen aerated confection according to claim 1 wherein the total amount of saturated fatty acids (by weight of the fatty acids) is less than 50%.

7. A frozen aerated confection according to claim 1 wherein the total amount of saturated fatty acids (by weight of the fatty acids) is greater than 30%.

8. A frozen aerated confection according to claim 1 wherein the saturated fatty acids comprise at least 60% palmitic acid (by weight of the saturated fatty acids).

9. A frozen aerated confection according to claim 1 which comprises 5 to 12% fat component (by weight of the frozen aerated confection).

10. A frozen aerated confection according to claim 1 having an overrun of between 40% and 250%.

* * * * *